US012671972B2

(12) United States Patent
Droste et al.

(10) Patent No.: US 12,671,972 B2
(45) Date of Patent: Jun. 30, 2026

(54) CONTROL OF MOBILE TELECOMMUNICATION DEVICES

(71) Applicant: GM GLOBAL TECHNOLOGY OPERATIONS LLC, Detroit, MI (US)

(72) Inventors: Scott T. Droste, West Bloomfield, MI (US); Khaled Rabbah, Canton, MI (US); Mohammad Ishfaq, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 490 days.

(21) Appl. No.: 18/327,109

(22) Filed: Jun. 1, 2023

(65) Prior Publication Data

US 2024/0406704 A1 Dec. 5, 2024

(51) Int. Cl.
*H04W 8/08* (2009.01)
*H04W 8/02* (2009.01)

(52) U.S. Cl.
CPC ..................................... *H04W 8/08* (2013.01)

(58) Field of Classification Search
CPC ........... H04W 8/00; H04W 8/02; H04W 8/04; H04W 8/08; H04W 8/06
See application file for complete search history.

(56) References Cited

U.S. PATENT DOCUMENTS

| | | | |
|---|---|---|---|
| 10,779,230 B1 * | 9/2020 | Sethi ...................... | H04W 60/04 |
| 2010/0311402 A1 * | 12/2010 | Srinivasan ............ | H04W 8/183 455/418 |
| 2014/0031033 A1 * | 1/2014 | Juang .................... | H04W 48/18 455/432.1 |
| 2017/0347259 A1 * | 11/2017 | Kwak ................... | H04W 8/183 |

* cited by examiner

*Primary Examiner* — Jinsong Hu
*Assistant Examiner* — Farideh Madani
(74) *Attorney, Agent, or Firm* — Quinn IP Law

(57) ABSTRACT

A method for operating a mobile telecommunications device connected to a first mobile telecommunications network having a country code identifying a first country includes determining whether the mobile telecommunications device crosses from the first country into a second country. The method also includes, if the mobile telecommunications device crosses from the first country into the second country, scanning, through the mobile telecommunications device, for mobile telecommunications networks discoverable to the mobile communications device, where each discoverable mobile telecommunications network has a country code identifying a service country of that mobile telecommunications network. Additionally, the method includes offering to a user of the mobile telecommunications device to manually connect the mobile telecommunications device to the discoverable mobile telecommunications networks in order of priority on a prioritized roaming list associated with the mobile telecommunications device and having a country code not identifying the first country.

12 Claims, 4 Drawing Sheets

CONTROL OF MOBILE TELECOMMUNICATION DEVICES

INTRODUCTION

The present disclosure is in the field of mobile telecommunications.

Mobile telecommunication devices such as cellular hand-held telephones and vehicle-based cellular telematics control units ("TCUs") connect to mobile telecommunication networks in order to communicate. A particular challenge to maintaining communications can occur when a mobile telecommunications device crosses a border between mobile telecommunication networks, such as an international border.

Mobile telecommunications such as cellular communications are used for a number of purposes. Voice communications are one such purpose. Vehicle route planning is another. Further, autonomous driving is another purpose for which mobile telecommunications are used. In view of the important purposes for which mobile telecommunications are used, a robust method of mobile telecommunications, including when crossing boundaries between mobile telecommunications networks, is desirable.

SUMMARY

Disclosed herein is a method for operating a mobile telecommunications device connected to a first mobile telecommunications network having a country code identifying a first country. The method includes determining whether the mobile telecommunications device crosses from the first country into a second country. The method also includes, if the mobile telecommunications device crosses from the first country into the second country, scanning, through the mobile telecommunications device, for mobile telecommunications networks discoverable to the mobile communications device, where each discoverable mobile telecommunications network has a country code identifying a service country of that mobile telecommunications network. Additionally, the method includes offering to a user of the mobile telecommunications device to manually connect the mobile telecommunications device to the discoverable mobile telecommunications networks in order of priority on a prioritized roaming list associated with the mobile telecommunications device and having a country code not identifying the first country.

In a variation, if the mobile telecommunications device has manually connected to a discoverable mobile telecommunications network, the method includes ceasing to offer to the user to manually connect to discoverable mobile telecommunications networks and entering, through the mobile telecommunications device, an automatic mobile telecommunications network selection routine. On the other hand, if the mobile telecommunications device does not successfully manually connect to a discoverable mobile telecommunications network after the user is offered to manually connect to all discoverable mobile telecommunications networks on the prioritized roaming list having a country code identifying the second country, the method may include entering, through the mobile telecommunications device, an automatic mobile telecommunications network selection routine.

Determining whether the mobile telecommunications device crosses from the first country into a second country may include sensing a position of the mobile telecommunications device and comparing the position of the mobile telecommunications device to a position of a boundary between the first country and the second country. Further, sensing a position of the mobile telecommunications device may include using GPS.

In variations, the prioritized roaming list may be stored in memory in the mobile telecommunications device and may further be stored in a universal subscriber identity module (USIM) in the mobile telecommunications device. As possible additional features, the prioritized roaming list may be an operator-preferred mobile telecommunications network list or a user-preferred mobile telecommunications network list. Further, the mobile telecommunications device may be a cellular mobile handset or a cellular telecommunications module fixedly mounted in a motor vehicle.

Also disclosed in the present disclosure is a method for operating a mobile telecommunications device connected to a first mobile telecommunications network having a network identifier that identifies the first mobile telecommunication network. The method includes determining whether the mobile telecommunications device crosses from a first designated service area of the first mobile telecommunications network into a second designated service area of a second mobile telecommunications network. If the mobile telecommunications device crosses from the first designated service area to the second designated service area, the method includes scanning, through the mobile telecommunications device, for mobile telecommunications networks discoverable to the mobile communications device, where each discoverable mobile telecommunications network is associated with a network identifier which identifies that discoverable mobile telecommunications network. Additionally, the method includes offering to a user of the mobile telecommunications device to manually connect the mobile telecommunications device to discoverable mobile telecommunications networks in order of priority on a prioritized roaming list associated with the mobile telecommunications device but not having the network identifier identifying the first mobile telecommunications network.

As a variation, if the mobile telecommunications device has manually connected to a discoverable mobile telecommunications network, the method may include ceasing to offer to the user to manually connect to discoverable mobile telecommunications networks and entering, through the mobile telecommunications device, an automatic mobile telecommunications network selection mode.

The method may also include, if the mobile telecommunications device does not successfully manually connect to a discoverable mobile telecommunications network after the user has been offered to manually connect to all discoverable mobile telecommunications networks on the prioritized roaming list but not having the network identifier identifying the first mobile telecommunications network, entering, through the mobile telecommunications device, an automatic mobile telecommunications network selection mode.

Further disclosed herein is a mobile telecommunications system. The system includes a mobile telecommunications device and one or more controllers collectively programmed with the following instructions: determine whether the mobile telecommunications device crosses from a first country into a second country; if the mobile telecommunications device crosses from the first country into the second country, scan, through the mobile telecommunications device, for mobile telecommunications networks discoverable to the mobile communications device, where each discoverable mobile telecommunications network has a country code identifying a service country of that mobile telecommunications network; and offer to a user of the mobile telecommunications device to manually connect the mobile telecommunications device to discoverable mobile telecommunications networks in order of priority on a prioritized roaming list associated with the mobile telecommunications device and having a country code not identifying the first country.

In a variation, the one or more controllers may be further collectively programmed with the following instructions: if the mobile telecommunications device has manually connected to a discoverable mobile telecommunications network, cease to offer to the user to manually connect to discoverable mobile telecommunications networks and enter, through the mobile telecommunications device, an automatic mobile telecommunications network selection mode.

In a further alternative, the one or more controllers may be further collectively programmed with the following instruction: if the mobile telecommunications device does not successfully manually connect to a discoverable mobile telecommunications network after attempting all discoverable mobile telecommunications networks on the prioritized roaming list and having the country code that identifies the second country, enter, through the mobile telecommunications device, an automatic mobile telecommunications network selection mode.

The instruction to determine whether the mobile telecommunications device has crossed from the first country into a second country may include the following instructions: sense a position of the mobile telecommunications device; and compare the position of the mobile telecommunications device to a position of a boundary between the first country and the second country.

In the mobile telecommunications system, the prioritized roaming list may be stored in memory in the mobile telecommunications device. As a variation, the prioritized roaming list may be stored in a universal subscriber identity module (USIM) in the mobile telecommunications device.

The above summary does not represent every embodiment or every aspect of this disclosure. The above-noted features and advantages of the present disclosure, as well as other possible features and advantages, will be readily apparent from the following detailed description of the embodiments and best modes for carrying out the disclosure when taken in connection with the accompanying drawings and appended claims. Moreover, this disclosure expressly includes combinations and sub-combinations of the elements and features presented above and below.

DETAILED DESCRIPTION

Figure 1:
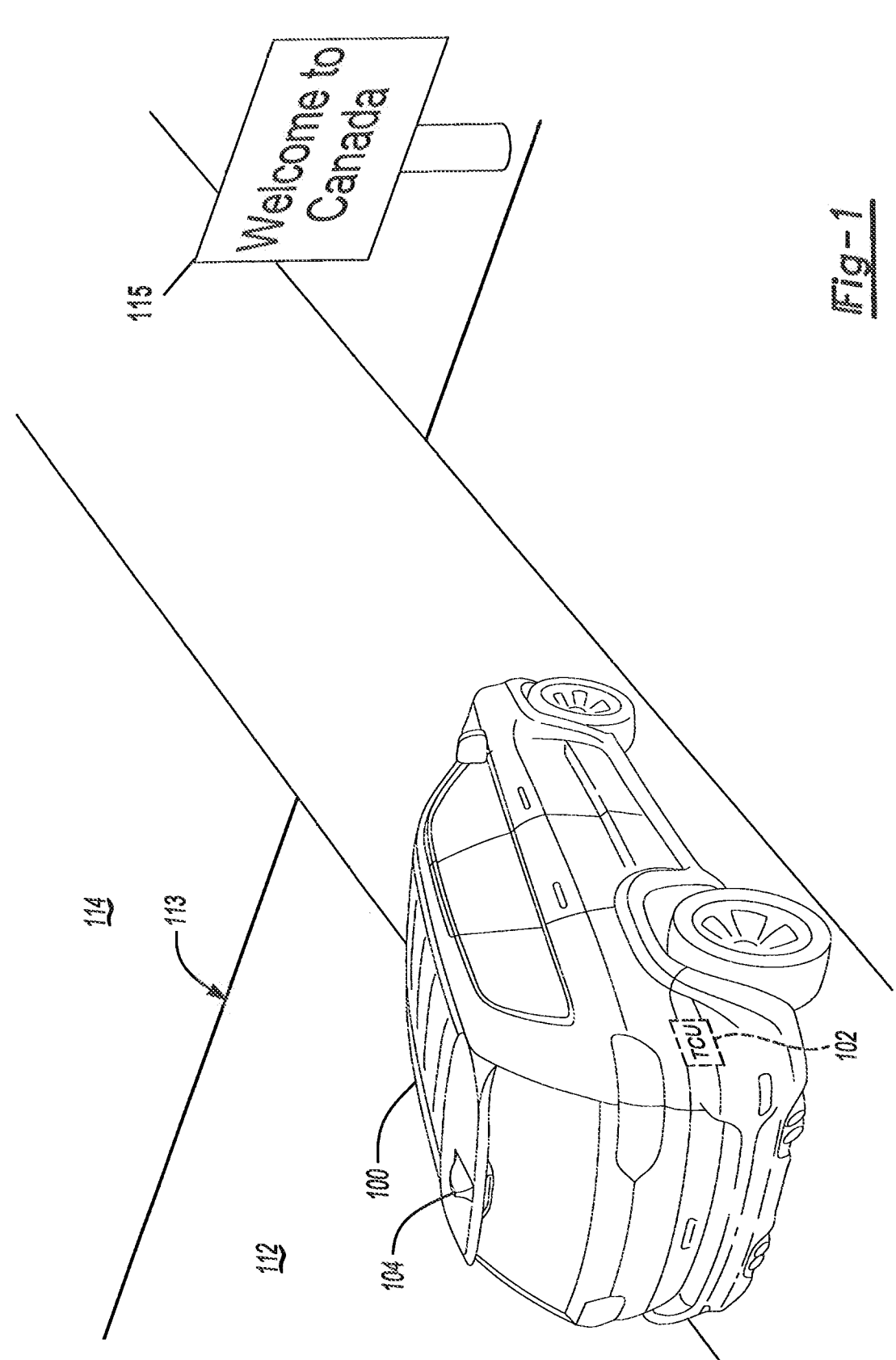
FIG. 1 is a view of a cellular-telecommunications-equipped vehicle crossing an international boundary.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

Referring first to FIG. 1, a vehicle 100 may have included therein a mobile telecommunications device such as a telematics control unit ("TCU") 102 that may be fixedly mounted within vehicle 100. In the example of this present disclosure, TCU 102 is adapted to communicate on cellular mobile telecommunications networks. Such cellular mobile communications networks may be referred to as private land mobile networks ("PLMNs"). TCU 102 may communicate via an appropriate vehicle-mounted antenna 104 to a PLMN, which then routes the communication appropriately for communication with other mobile telecommunications devices as well as with stationary telecommunications devices such as landline telephones. In addition to TCU 102, the teachings of this disclosure are certainly applicable to other mobile telecommunications devices such as cellular mobile handsets.

Figure 2:
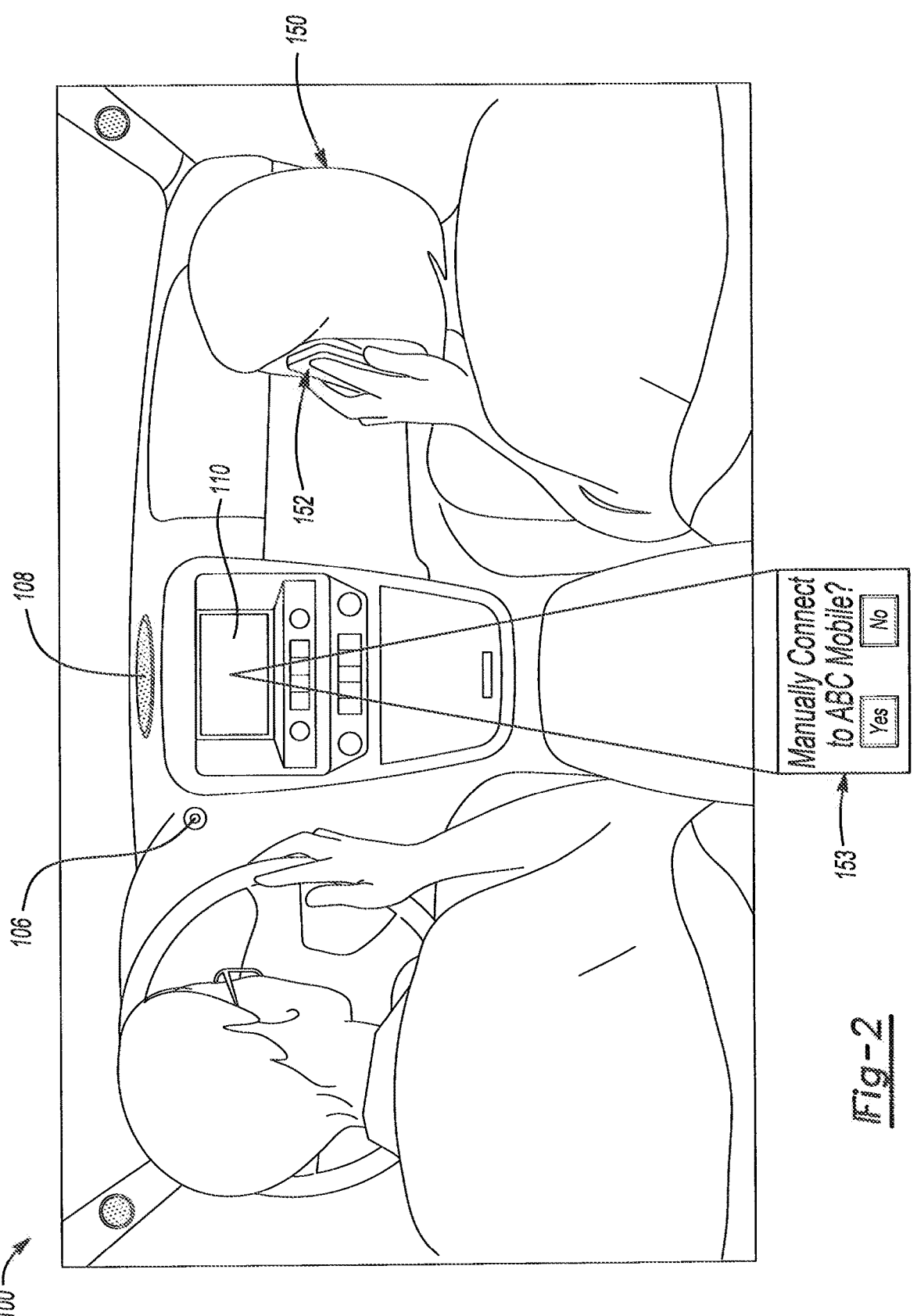
FIG. 2 is a view inside the vehicle of FIG. 1.
Figure 3:
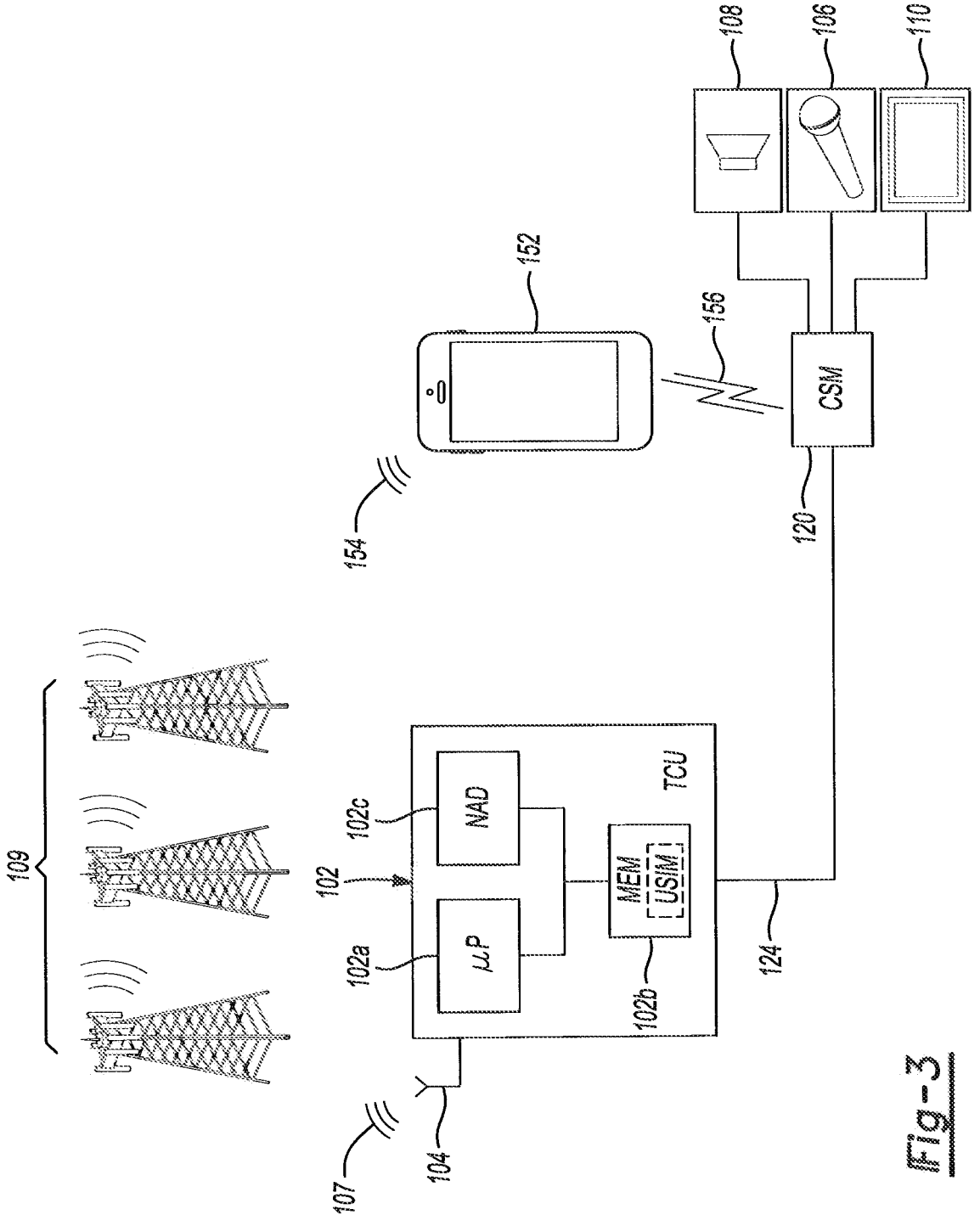
FIG. 3 is a block diagram of a mobile telecommunications system according to one embodiment of the present disclosure.

Refer now additionally to FIGS. 2 and 3. Vehicle 100 may include interfaces for mobile cellular telecommunications via TCU 102. Vehicle 100 may include a microphone 106, one or more speakers 108, and a video display 110. Those devices may be controlled by a center stack module ("CSM") 120. TCU 102 may be electrically coupled with CSM 120, such as by a digital data bus 124 and/or via dedicated electrical circuits. Via microphone 106, speaker 108, and display 110, an occupant of vehicle 100 may place and receive mobile phone calls through TCU 102's connection by electromagnetic radiation 107 with mobile telecommunication towers 109. Mobile telecommunication towers 109 may belong to one or more mobile telecommunication networks and are shown schematically for the purposes of this disclosure.

An occupant 150 of vehicle 100 may also have a portable mobile telecommunications device, such as a mobile handset 152. Occupant 150 may communicate via mobile handset 152 on a mobile telecommunications network associated with mobile handset 152 by electromagnetic radiation 154. The interface between occupant 150 and mobile handset 152 may be through interfaces provided on mobile handset 152 itself (touch screen, microphone, and speaker); as pictured in FIG. 2, occupant 150 is using mobile handset 152 in this manner. Alternatively, via a short-range wireless connection 156 such as Bluetooth technology, occupant 150 may place and receive calls using mobile handset 152 for connection with the cellular telecommunications network but use microphone 106, speakers 108, and display 110 for user interface with mobile handset 152.

TCU 102 is a microcomputer-based device that has sufficient electronic resources (microprocessor 102*a*, memory 102*b*, cellular network access device ("NAD") 102*c*, inputs, outputs, access to power and to a sufficient antenna, software and the like) to perform the functions ascribed to it herein. Vehicle 100 also may have one or more additional electronic control units, including CSM 120, which themselves have sufficient electronic resources to perform their prescribed tasks. Given networking that may be available in many motor vehicles, the various electronic control units on vehicle 100 may be networked together and may collectively perform the functions described in this disclosure. Mobile handset 152 may also be a microcomputer-based device having its own sufficient electronic resources.

According to current cellular telecommunications standards, each PLMN is uniquely identified by the combination of a mobile country code ("MCC") and a mobile network code ("MNC"). The MCC identifies the country that the PLMN is designated to serve; each country has one or more MCCs. Then, within a country, the MNCs identify specific PLMNs operated by various mobile telecommunications operators. A few MCC/MNC combinations are shown here as examples:

| MCC | Country | MNC | Network Operator |
|---|---|---|---|
| 302 | Canada | 320 | Rogers Communications |
| 302 | Canada | 360 | Telus Mobility |
| 310 | USA | 220 | T-Mobile |
| 310 | USA | 270 | T-Mobile |
| 311 | USA | 270 | Verizon Wireless |
| 312 | USA | 670 | AT&T Mobility |

This brief example illustrates that a country (the United States, for instance) may be identified by one or more MCCs. However, a given MCC may only designate one country.

A mobile telecommunications device carries an identifier that identifies, among other things, a "home" PLMN (identified by MCC and MNC) in which the mobile telecommunications device is designated to operate. That identifier may be electronically carried on a physical device referred to as a subscriber identification module (or "SIM") card, which is typically a preprogrammed physical electronic card inserted into the subscriber's device. Alternatively, information stored in a SIM may be stored in the memory of the mobile telecommunications device, in which case it may be referred to as a universal subscriber identification module (or "USIM"). Other identifying methods for a mobile telecommunications device other than SIMs or USIMs are certainly contemplated by this disclosure.

A USIM may, in addition to carrying identification information about the home PLMN of a mobile telecommunications device, carry information regarding preferred roaming PLMN(s) (that is, PLMN(s) outside the home PLMN) of the mobile telecommunications device. Such roaming PLMN(s) would be PLMN(s) through which a mobile telecommunications device would connect when the mobile telecommunications device leaves its home PLMN. Through such a mechanism, the mobile communications device may continue to communicate despite leaving its home PLMN. The network operator of the home PLMN will in general have roaming agreements with other network operators of certain other PLMNs, such that the mobile communications device may "roam" to such other PLMNs as the mobile telecommunications device leaves its home PLMN.

A mobile telecommunication device may also in some cases have more than one home PLMN and may "roam" when it leaves all of its home PLMNs.

Referred to as OPLMNs (operator-preferred public land mobile networks), the roaming networks included in the USIM may be generally listed in priority order. That is, as the mobile telecommunications device leaves its home PLMN, it may try to connect instead to an OPLMN in order of priority.

With continuing reference to FIG. 1, as vehicle 100 approaches an international boundary 113 while in a first country 112, TCU 102 or mobile handset 152 will, in general, already be connected (or attached) to a PLMN associated with the first country 112. As the TCU 102 or mobile handset 152 crosses international boundary 113 from first country 112 into a second country 114, TCU 102 or mobile handset 152 will, according to existing telecommunications standards, attempt to maintain connection with the PLMN to which TCU 102 or mobile handset 152 was connected when TCU 102 or mobile handset 152 was in first country 112. Even if a weakening radiofrequency connection between the PLMN and TCU 102 or mobile handset 152 occurs and, even if communication is temporarily interrupted, TCU 102 or mobile handset 152 will continue to attempt to maintain connection with or reconnect to the PLMN to which it was connected in first country 112. This can interfere with TCU 102 or mobile handset 152 making a prompt and reliable connection with a PLMN in second country 114. International boundary 113 may be designated by signage 115 welcoming people as they enter second country 114.

Figure 4:
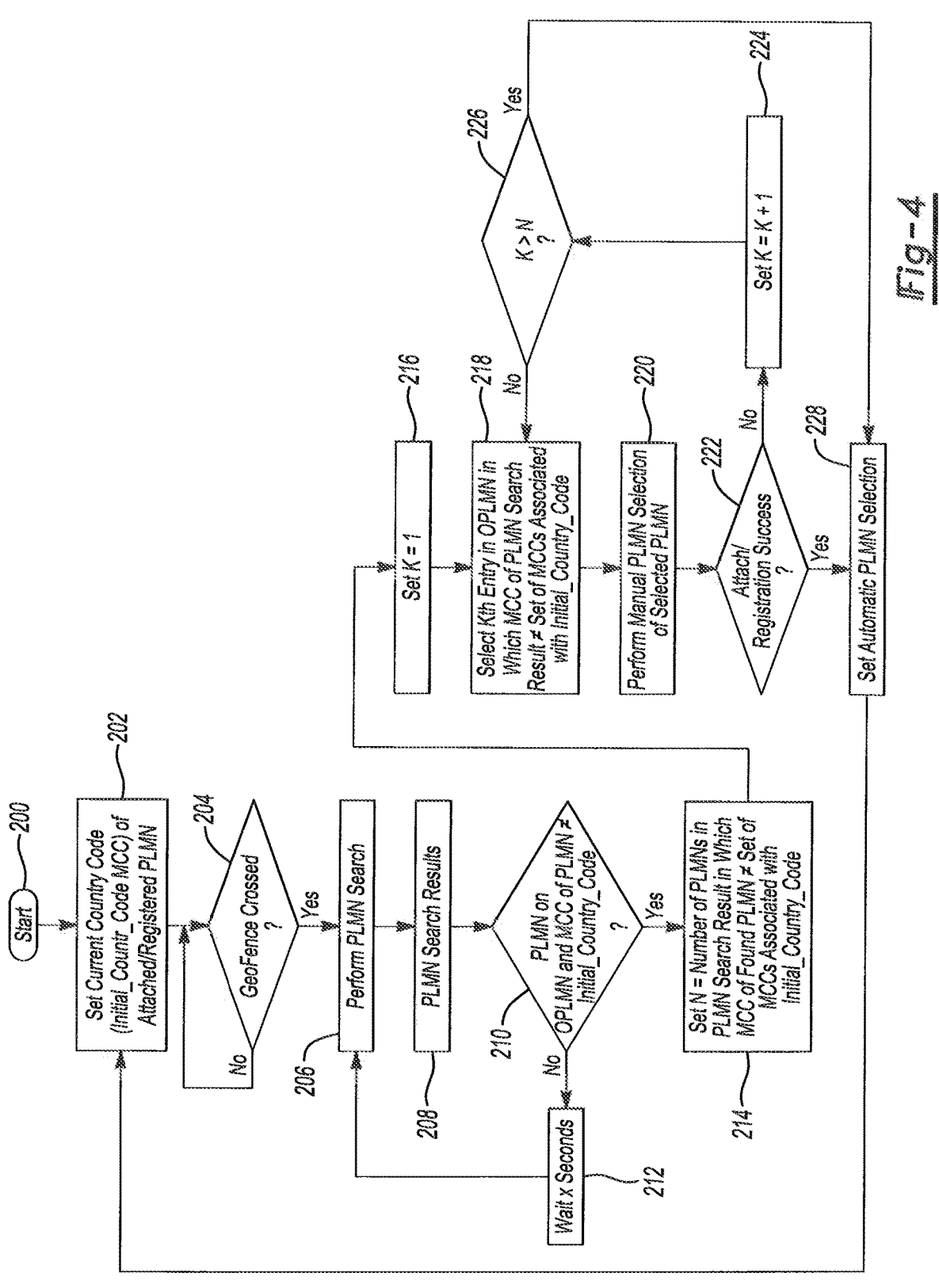
FIG. 4 shows a method for controlling the mobile telecommunications system when the vehicle crosses the international boundary.

With further reference now to FIG. 4, a method of reliably and quickly establishing communications between TCU 102 or mobile handset 152 and a PLMN in second country 114 is disclosed. The method may be performed by TCU 102 (to the extent TCU 102 is being used for cellular telecommunications) or by mobile handset 152 (to the extent mobile handset 152 is being used for cellular telecommunications). The method starts at block 200 and then, at block 202, TCU 102 or mobile handset 152 may store in memory the mobile country code ("MCC") of the PLMN to which TCU 102 or mobile handset 152 is attached or connected. At block 204, TCU 102 or mobile handset 152 may test to determine whether it has crossed a country border such as international boundary 113. In this example, this test is done by comparing the position of TCU 102 or mobile handset 152, which may be known because TCU 102 or mobile handset 152 may have global positioning system ("GPS") positioning capability and because TCU 102 or mobile handset 152 may carry the geographic coordinates of international boundary 113 programmed in its memory or have access to geographic coordinates of international boundary 113 through online access to appropriate databases. When TCU 102 or mobile handset 152 has crossed a border such as international boundary 113, TCU 102 or mobile handset 152 will know (via "geofencing") that it is now in another country such as second country 114. TCU 102 or mobile handset 152 may also know its position through other methods than solely using GPS, such as dead reckoning from a known starting position, or through a combination of positioning methods.

TCU 102 or mobile handset 152 may continually test at block 204 to determine whether TCU 102 or mobile handset 152 has crossed an international boundary. If TCU 102 or mobile handset 152 determines that it has crossed a boundary such as international boundary 113, the method continues at block 206.

At block 206, TCU 102 or mobile handset 152 may perform a search for each PLMN that TCU 102 or mobile handset 152 can discover. Naturally, those PLMNs are within radio communication range of TCU 102 or mobile handset 152 and are potential PLMNs to which TCU 102 or mobile handset 152 may be able to attach or connect. The discovered PLMNs are accumulated in memory of TCU 102 or mobile handset 152 at block 208.

At block 210, TCU 102 or mobile handset 152 may test each discovered PLMN to determine whether the PLMN is on the OPLMN list (the "operator preferred public land mobile network" list), namely, the list of PLMNs to which TCU 102 or mobile handset 152 may potentially connect with as a roaming network. TCU 102 or mobile handset 152 may also test whether the discovered PLMN has a mobile country code that designates a different country than the previously-stored MCC (stored at block 202) designates.

If no PLMNs satisfy both of the tests applied at block 210, the process continues to block 212, where a waiting period, which may be one or more seconds, is applied. The search for discoverable PLMNs then occurs again at block 206.

If, however, one or more PLMNs successfully meet the test at block 210, a variable N is set at block 214 to designate the number of PLMNs that successfully met the test at block 210. A counter K is then initialized to K=1 at block 216.

At block 218, TCU 102 or mobile handset 152 selects the Kth entry in the OPLMN list in which the discovered PLMN is not associated with an MCC of the country that TCU 102 or mobile handset 152 has just left, such as first country 112. Because K has just been initialized to K=1 at this point, the first OPLMN on the list of OPLMNs is selected. Recall that the OPLMN list is a prioritized list of roaming networks for TCU 102 or mobile handset 152.

At block 220, TCU 102 or mobile handset 152 may offer to occupant 150 to manually select and connect to the PLMN identified at block 218. This manual selection may occur by occupant 150 being offered, via message 153 on display 110, to connect to the PLMN identified at block 218. If occupant 150 elects to make such manual connection and if such manual connection is successful, reliable communication has been established in second country 114. (Here, "successful" connection may refer to a connection that is functional for cellular communications purposes.) At block 228, TCU 102 or mobile handset 152 may then revert to their normal automatic PLMN selection functionality, mode, or routine.

Note that message 153 may also appear on the screen of mobile handset 152, for instance, if mobile handset 152 (as opposed to TCU 102) is being used for the mobile communication and display 110 (via short-range wireless connection 156) is not being used as the user interface for mobile handset 152.

However, if a successful attachment has not been made at block 222, the process continues to block 224, where counter K is incremented, and block 226 where it is tested to determine whether all of the N PLMNs identified in blocks 210 and 214 have been considered. If yes, TCU 102 or mobile handset 152 may then revert to its normal automatic PLMN selection functionality, mode, or routine at block 228, given that no manual connection to a PLMN identified in blocks 210 and 214 met the criteria of block 218 (namely, the PLMN had a country code that did not identify first country 112 that TCU 102 or mobile handset 152 had just left and the PLMN was on the OPLMN list) could be made.

The process identified in FIG. 4 has been demonstrated to reduce the likelihood that after crossing an international boundary from a first country into a second country, TCU 102 or mobile handset 152 will suffer substantial delays in providing reliable cellular telecommunications service in the second country. In a specific test case of the system and method of the present disclosure, the distance after crossing an international boundary during which cellular telecommunications were unreliable was reduced from an order of miles to an order of approximately 100 meters.

The USIM may also carry UPLMNs (user-preferred public land mobile networks) that may be included by the user of the mobile telecommunications device and may also be listed in priority order for roaming connection. Such a list may be used, additionally or alternatively, as well as use of OPLMNs as described herein.

As an alternative for blocks 210, 214 and 218, whether a respective PLMN has a country code of the country into which TCU 102 or mobile handset 152 has entered may be considered, rather than whether the respective PLMN does not have a country code of the country that TCU 102 or mobile handset 152 has left.

The method provided herein may also be used when crossing boundaries between PLMNs in a single country, to the extent that the mobile telecommunications device (TCU 102 or mobile handset 152, for instance) knows or has access to geographic boundaries between PLMNs such as, say, via access to the Internet or via such information stored in memory. A similar "geofencing" technique as that discussed above may be employed in that case.

What is claimed is:

1. A mobile telecommunications system comprising:
a mobile telecommunications device; and
one or more controllers collectively programmed with the following instructions:
store in memory a first country code for a mobile telecommunications network to which the mobile telecommunications device is attached;
determine that the mobile telecommunications device has crossed a country border;
perform a first search for private land mobile networks detectable by the mobile telecommunications device that have a country code different from the first country code;
determine that no private land mobile network has been detected by the first search;
wait a predetermined time and perform a second search of private land mobile networks detectable by the mobile telecommunications device that have a country code different from the first country code;
determine that at least one private land mobile network has been detected by the second search;
create a list of "n" private land mobile networks detected by the second search;
set a counter "k", wherein k indexes from 1 to n;
select a kth private land mobile network in the list;
offer to a user to perform manual private land mobile network selection of the kth private land mobile network in the list; and
upon success in attaching to the kth private land mobile network in the list, set the mobile telecommunications device to automatic private land mobile network selection.

2. The mobile telecommunications system of claim 1, wherein "n" is greater than one.

3. The mobile telecommunications system of claim 1, wherein the mobile telecommunications device is a cellular telecommunications module fixedly mounted in a motor vehicle.

4. The mobile telecommunications system of claim 1, wherein the mobile telecommunications device is a cellular mobile handset.

5. The mobile telecommunications system of claim 1, wherein the instruction to determine that the mobile telecommunications device has crossed a country border includes instructions to:

sense a position of the mobile telecommunications device; and compare the position of the mobile telecommunications device to a position of the country border.

6. The mobile telecommunications system of claim 5, wherein the instruction to sense the position of the mobile telecommunications device includes using GPS.

7. A method for operating a mobile telecommunications system that includes a mobile telecommunications device, the method comprising, through one or more controllers:

storing in memory a first country code for a mobile telecommunications network to which the mobile telecommunications device is attached;

determining that the mobile telecommunications device has crossed a country border;

performing a first search for private land mobile networks detectable by the mobile telecommunications device that have a country code different from the first country code;

determining that no private land mobile network has been detected by the first search;

waiting a predetermined time and performing a second search of private land mobile networks detectable by the mobile telecommunications device that have a country code different from the first country code;

determining that at least one private land mobile network has been detected by the second search;

creating a list of "n" private land mobile networks detected by the second search;

setting a counter "k", wherein k indexes from 1 to n;

selecting a kth private land mobile network in the list;

offering to a user to perform manual private land mobile network selection of the kth private land mobile network in the list; and upon success in attaching to the kth private land mobile network in the list, setting the mobile telecommunications device to automatic private land mobile network selection.

8. The method of claim 7, wherein "n" is greater than one.

9. The method of claim 7, wherein the mobile telecommunications device is a cellular telecommunications module fixedly mounted in a motor vehicle.

10. The method of claim 7, wherein the mobile telecommunications device is a cellular mobile handset.

11. The method of claim 7, wherein determining that the mobile telecommunications device has crossed a country border further comprises:

sensing a position of the mobile telecommunications device; and comparing the position of the mobile telecommunications device to a position of the country border.

12. The method of claim 11, wherein sensing the position of the mobile telecommunications device comprises using GPS.

* * * * *